United States Patent Office 3,432,649
Patented Mar. 11, 1969

3,432,649
CORRELATING SYSTEM
Ralph A. Landrum, Jr., Tulsa, Okla., assignor to Pan American Petroleum Corporation, Tulsa, Okla., a corporation of Delaware
Filed Mar. 10, 1965, Ser. No. 438,503
U.S. Cl. 235—181
Int. Cl. G06g 7/19; G06f 15/34
10 Claims

ABSTRACT OF THE DISCLOSURE

This invention concerns a novel system for correlating one function with a second function. A first function is placed on an image storage means where the image is displayed for several minutes. A photoconductive material is placed on the face of the image storage means such that the pattern of the image storage means makes a conductive pattern on the conductive material of the same shape as the image on the image storage means. The second time function is placed on magnetic tape. The tape is moved by and in close contact with the photoconductive material. Conductors are in contact with the photoconductive material and lead to integrating and recording means so that in effect as the two functions are moved with respect to each other, they are correlated.

---

The present invention concerns a system for correlating one function with a second function. It particularly relates to a system for use in correlating a seismic record with a selected function or signal.

Geophysical prospecting, using artificially induced seismic disturbances, has found wide application in the search for petroleum. It is the general practice to initiate a seismic disturbance at a point near the surface of the earth to direct the seismic waves downward into the earth from that point. A method which has recently attracted considerable interest is to couple a hydraulically actuated vibrator to the earth and control the vibrator with a drive or a control signal. The drive or control signal may last one to six seconds or more. The seismic waves which are directed downwardly continue to travel until they encounter discontinuities in the earth's structure in the form of various subsurface formations. These discontinuities have the effect of reflecting a portion of the seismic waves back toward the surface of the earth. By arranging a plurality of geophones at a distance remote from the seismic disturbance point, it is possible to detect the arrival of the reflected seismic waves at the surface of the earth. These detected waves are translated into electrical impulses which are indicative of the character of the ground motion and are usually referred to as a seismic signal or a seismic record which in effect is a composite signal made up of a plurality of electrical signals varying in frequency and in amplitude.

It is common practice to record up to twenty-four or more separate signals simultaneously from separate geophone locations in a side-by-side relationship. This is normally referred to as a seismic section. A timing trace indicating predetermined time intervals is simultaneously recorded with the seismic signals to indicate time on each trace.

In order to make a seismic record more usable, it is frequently subjected to a correlation process. This is especially true in those records obtained from a hydraulic vibrator in which a continuous finite elastic wave has been imparted to the earth. Theory of correlation between two signals is well known and simply stated, is the operation of measuring the similarity between two time wave forms. If two wave forms $g(t)$ and $r(t)$ are considered within the time interval T, the finite crosscorrelation function is expressed mathematically by $$\phi_{gr}(\tau) = \frac{1}{T}\int_0^T g(t)r(t+\tau)dt$$

The evaluation involves multiplication of corresponding ordinates and summing of the products for each of the many values of $\tau$.

In geophysical prospecting these signals might, for example, be such that $g(t)$ represents the control signal for driving a hydraulic vibrator and $r(t)$ represents the received signal.

Methods of making apparatus for evaluation of this function, $\phi_{gr}(\tau)$, by multiplication and integration for each of numerous values of $\tau$ is described in the prior art. Various schemes have been devised to facilitate the correlation of $g(t)$ with $r(t)$. For example, an optical correlator has been tried in which each signal is placed or recorded as variations in light transmissibility on separate transparent recording mediums which are placed adjacent each other in timewise alignment. Light is passed through the recording mediums as the recording mediums are moved relative to each other. Light passing therethrough is a function of the multiplication of the two signals and is detected by a photoelectric cell whose output is integrated over the time interval T of interest. Although in some cases this system may work satisfactorily, when it is desired to change the signals, there is a considerable amount of chemical development of film strips, which is a slow and costly process.

Another correlator system includes a magnetically recorded track on a magnetic tape and a plastic strip on which has been etched a conductive strip resembling a wire bent to fit the contour of the analog curve of the scanning function. The memory tape is placed in contact with the plastic strip and one is moved relative to the other. The voltage across the ends of the conductive strip is a function of the correlation of the signal on the memory tape with the signal represented by the conductive strip. This system provides good correlation and is fairly satisfactory where it is not desired to use a variation of arbitrary crosscorrelation functions. If the function is changed, the conductive strip must be changed, i.e., removed from the system and replaced by another strip having the new function. It also requires considerable time to photoetch a copper strip on a plastic medium. It is therefore, apparent that there is a desire and need for a system whereby the crosscorrelation function can be rapidly changed as desired without physically removing and replacing a conductive strip and without appreciable time delay. This invention discloses such a system.

In the present invention the signal, e.g., $r(t)$, to be correlated is prepared in flux density variations on magnetic tape and the other correlating signal, e.g., $g(t)$, is prepared in the form of an analog conductor. In a preferred embodiment of this invention a photoconductive medium is placed over the face of an image storage cathode ray tube. The photoconductive medium is shielded from all light except the light of the image on the storage tube. The correlating function is then stored as a display on the screen of the storage tube. There is established on the photoconductive material a conductive pattern which takes the shape of the correlating function $g(t)$. Means are provided to transport the magnetic tape, on which the first signal $r(t)$ is recorded, in intimate contact with the photoconductive material. The voltage developed across the ends of the conductive image on the photoconductive material, as the magnetic tape is moved across the face thereof, is a measure of the correlation of the signal recorded on the magnetic tape and of the signal on the storage tube.

Various objects and a better understanding of the invention will be had from the following description taken in conjunction with the drawing in which.

Figure 1:
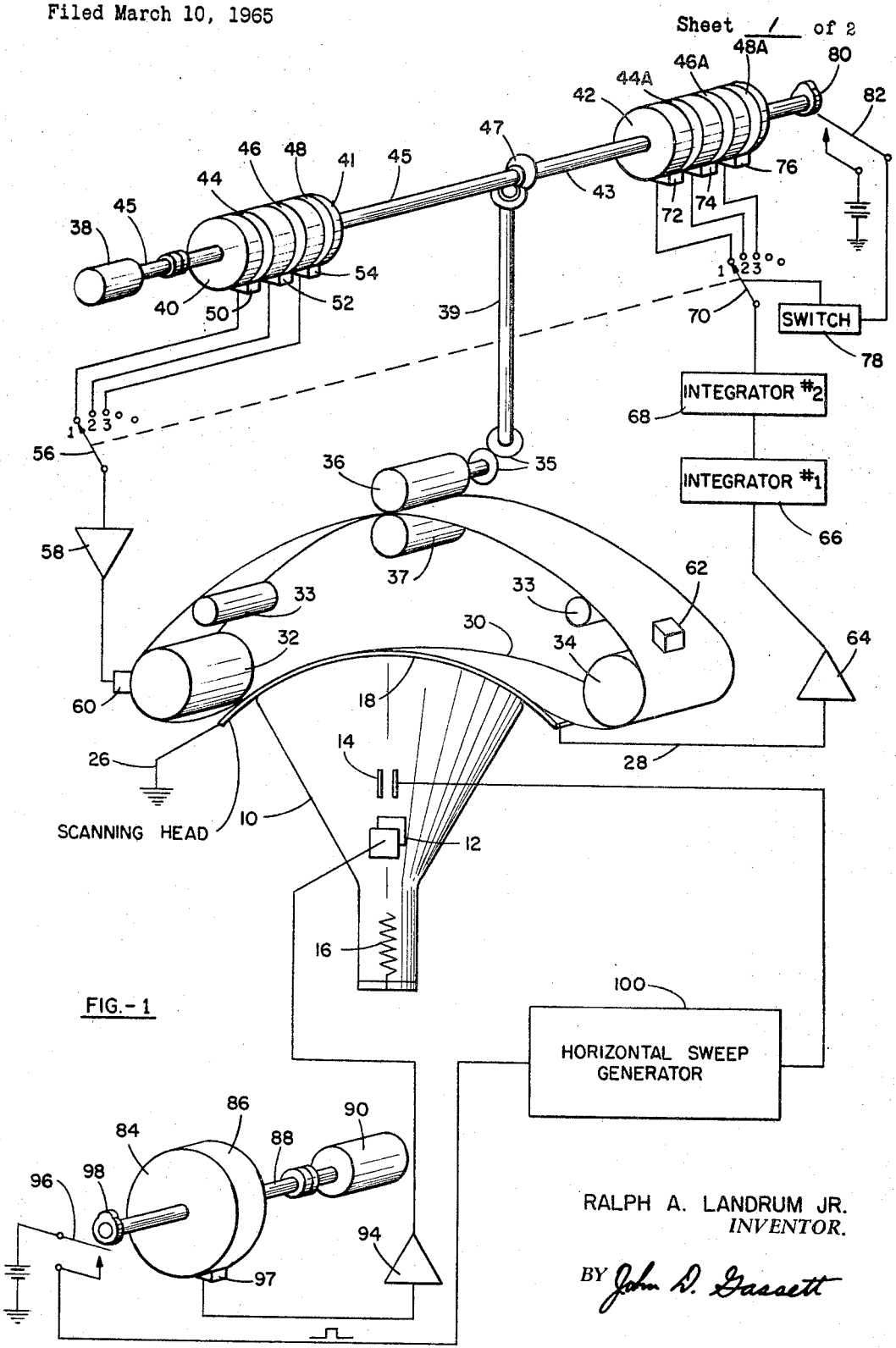
FIGURE 1 represents a schematic diagram of this invention for use in correlating a plurality of seismic signals with a correlating function.

Although the system of this invention is useful in correlating any time function by a second time function, it finds particular use in the art of seismic prospecting. Therefore, the embodiment illustrated in the drawing is directed toward seismic prospecting in which the function $g(t)$ represents the correlating function and $r(t)$ the received seismic signal, e.g., those signal reflections detected by geophones.

Figure 3:
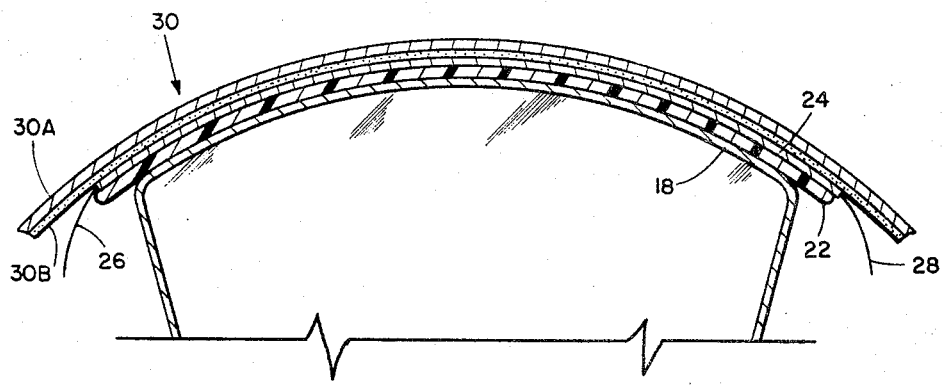
FIGURE 3 illustrates a cross section of a part of the scanning head and face of the image storage tube.

That portion of the device which is used to provide the function $g(t)$ in analog conductive form will be discussed first. Illustrated in FIGURE 1 is an image storage tube 10 having vertical deflection plates 12, horizontal deflection plates 14, an intensity grid 16, and a face 18. Storage tube 10 is a special type cathode ray oscilloscope which can display the image of a transient event on its screen or face 18 for long periods of time, that is up to several minutes or longer, without appreciable decay. A suitable image storage tube is commercially available from Hughes Industrial Systems Division, Los Angeles 45, Calif., and is identified as the Hughes Memo-Scope. A scanning head device for providing a conductive path representative of $g(t)$ is positioned adjacent face 18 of the storage tube. The scanning head device as shown more clearly in FIGURE 3, includes a thin plastic material or strip 22 that is coated on one side with a photoconductive emulsion 24 and having wires 26 and 28 mechanically and electrically connected to the ends of the strip. A suitable photoconductive emulsion includes cadmium sulfide, gallium arsenide, and lead sulfide. Placed adjacent the scanning head device is a magnetic memory medium, frequently called a storage medium, which can be a conventional magnetic storage or memory tape 30 having a backing 30A and a coating 30B such as a magnetic oxide which is preferably capable of receiving A-C-bias direct recording and upon which the signal $r(t)$, e.g., a seismic record signal, is stored.

Figure 2:
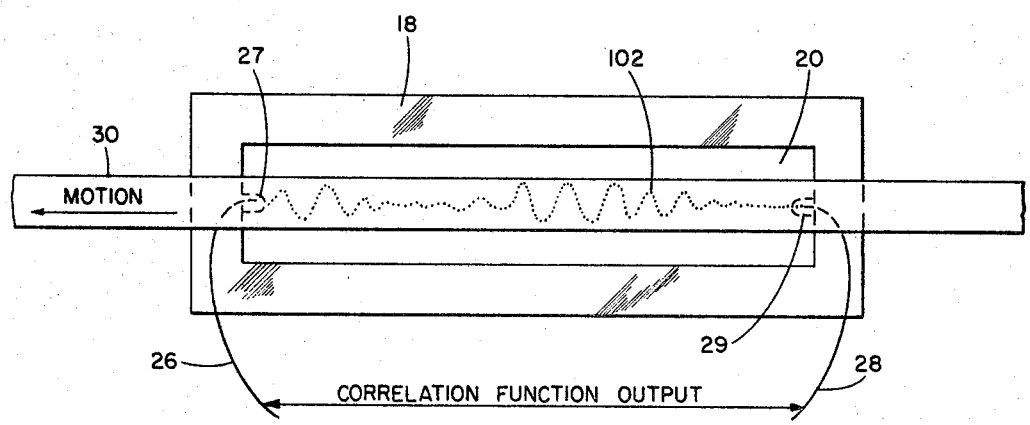
FIGURE 2 is a partial view of the face of the image storage tube, the conductive strip, and magnetic memory tape of FIGURE 1.

The emulsion can be on either side of the strip. To prevent wear of emulsion 24 as magnetic tape 30 is moved by it, the emulsion should be between face 18 and the plastic strip 22. In this case the plastic strip 22 can be opaque which will aid in shielding the emulsion from stray light. However, for best induction of current, the emulsion should be on the side of the strip next to the magnetic tape. Here strip 22 should be transparent so that light pattern from the storage tube can render the emulsion conductive in the same pattern. The unit should be shielded from stray light, preferably by a suitable cover (not shown). A sufficiently wide memory tape also aids in shielding the emulsion. Wires 26 and 28 should be secured to the plastic at points or areas 27 and 29 which coincide with the axis and ends of the time function placed on the scanning head, as shown in FIGURE 2.

Tape 30 is preferably an endless belt and is held in firm contact with scanning head 22 by pressure rollers 32 and 34 and idler rollers 33. The belt is driven by drive means which can include a drive platen 36 and backup platen 37.

Also shown in FIGURE 1 is a playback drum 40 on which seismic signals to be correlated are reproduced and a re-recording drum 42 on which the resulting correlated signal is stored. Drive means 38 drives record playback drum 40 and re-recording drum 42 through shaft 45, as well as tape 30, in such a manner that tape 30, drum 40, and drum 42 are driven in synchronism. Drive platen 36 has gear 35 driven by a mating gear on shaft 39 which is powered by gear 47 on shaft 45. The drive speed and synchronism of movement are effected by these or other well-known means in a known manner.

Shown on playback drum 40 are three channels of information on magnetic tape 41 which can represent, for example, seismic traces represented by channels 44, 46 and 48. There are normally many more traces recorded on tape 41 than shown, but these are sufficient for illustration purposes. Associated with these records are reproducing heads 50, 52, and 54. The output of heads 50, 52, and 54 are connected, respectively, to contacts 1, 2, and 3 of a sequence switch 56. The base terminal of switch 56 is connected to amplifier 58 whose output is connected to recording head 60 which is placed adjacent memory tape 30.

On the opposite edge of face 18 of the image storage tube 10 from recording head 60 is an erase head 62. In operation a signal from storage drum 40 is A-C-biased recorded by head 60 on tape 30. The tape with the signal is then passed or driven by drive means 38 across the face of storage tube 10 in contact with the scanning head device or more particularly emulsion 24 on strip 22. The magnetic tape is driven past erase head 62 where all signals on the tape are removed after the signal has contacted the entire effective length of strip 22.

The voltage impressed across leads 26 and 28 of the scanning head is stored on re-recording drum 42. Means for this include an amplifier 64, a first integrator 66, a second integrator 68, connected in series and a selector switch 70 having positions 1, 2, and 3 which are connected respectively to recording heads 72, 74, and 76 which are arranged to record on channels 44A, 46A, and 48A, respectively, on the recording medium on re-recording drum 42. The functions of integrators 66 and 68 will be explained hereinafter.

It is desired to record the correlation of signals 44, 46 and 48 on channels 44A, 46A, and 48A, respectively, of re-recording drum 42. This is accomplished by ganging switches 56 and 70 as indicated. A switch indexing mechanism 78 can be provided to automatically control the advancement of switches 56 and 70 through their various positions which can be any convenient number so that the records stored on drum 40 are automatically and sequentially reproduced, processed, and re-recorded in correlated form. Such control means includes a cam 80 mounted on the shaft of drum 45 which at the end of each revolution closes a switch 82. This generates a pulse which is sent to switch indexing mechanism 78 which then advances switches 56 and 70 to their next position.

Attention will not be directed toward means for placing the correlating function $g(t)$ upon the face 18 of storage tube 10. This conveniently includes a drum 84 upon which is placed a magnetic tape 86 having the desired function recorded thereon. The drum is driven through shaft 88 by motor 90. A read head 92 is placed adjacent tape 86. The output of read head 92 is fed through reproducing amplifier 94 to vertical deflection plates 12 of the storage tube. The start of the reproducing function from tape 86 is synchronized with the horizontal deflection sweep signal. One form of accomplishing this is by a cam operated switch 96 operated by cam 98 on the shaft of the function generator drum 86. When switch 96 is closed, a synchronizing pulse is transmitted to trigger the horizontal sweep generator 100 whose output is connected to horizontal deflection plates 14 of the image storage tube. This assures that the sweep of the electron beam horizontally is synchronized with the generation of the function $g(t)$.

Having described the components of a preferred embodiment of this invention, attention will now be directed briefly toward its operation. In performing the desired operation, one signal $g(t)$ is provided in the form of a conductor, that is an amplitude signal in the time domain, and the second signal $r(t)$, for example, is recorded in a flux density variation on a magnetic tape. The scanning function head is placed on the face of tube 10, as explained above. The entire face of the storage tube, scanning head, and memory tube are enclosed in a light-proof container or enclosure. Thus photoconductive material 24 is nonconductive so long as there is no image on face 18. A tape containing a selected function $g(t)$ is placed on drum 84 and motor 90 is started. This does two things; it starts the horizontal sweep generator to drive the electron beam horizontally across the storage tube and it also controls the vertical deflection so that the function $g(t)$ is placed upon the face of the tube 18 in analog form. A pattern on emulsion 24 becomes conductive along a path which is the analog form of function $g(t)$. This is indicated by the dotted line 102 of FIGURE 2. Thus, there is generated a conductive path between leads 26 and 28. The intensity of grid 16 is controlled uniformly in a conventional manner for the duration of the horizontal sweep.

The signal which is to be correlated with the function $g(t)$ is stored on drum 40. At any reasonable time after $g(t)$ has been placed upon the scanning head, drive 38 is started to reproduce the signal $r(t)$ represented by the recording on channel 44 and to record such signal through head 60 on tape 30. The signal $r(t)$ is impressed upon tape 30 by direct recording, preferably by A-C-biased direct recording. The amplitude scale of the function $g(t)$ on the photoconductive emulsion is such as to permit maximum amplitude of the function within the width of the memory tape 30 and with the time scale which corresponds relative to the time represented by the passage of the tape by the scanning head.

The variation in the normal flux component of the memory tape 30 represents the first time derivative of the function $r(t)$ at a time scale corresponding to the velocity of the tape. The lines of flux of magnetic tape 30 as it passes adjacent conductive line 102 of the scanning head, induce within each element of the conductive line a voltage which is proportional to the product of the normal flux component cut by the element multiplied by the slope of the element, as influenced by the velocity of the tape. The term "element," as used here, means an incremental length $dl$ of the conductive line 102. As the slope of each element is the first derivative of the function $g(t)$, the voltage induced in each element is proportional to the product of the instantaneous value of the derivatives of the two functions. The total voltage appearing between the ends of the conductive line is the integral or sum of all the voltages induced in each element. This total voltage is, therefore, proportional to the finite crosscorrelation of the first derivative of the two functions $r(t)$ and $g(t)$.

The finite crosscorrelation of the signals $r(t)$ and $g(t)$ is obtained by performing two steps of integration on the voltage appearing between the ends of the conductive line. The following shows this to be true. In the techniques of Transform Calculus, performing two steps of integration on two convolved functions $r'(t)$ and $g'(-t)$ amounts to dividing the product of their linear transforms by the square of the independent variable of the transform. It is also equivalent to dividing the transform of each function by the variable of the transform and subsequently multiplying the two quotients. This is the convolution of the integrals of the two functions; that is, the convolution of $\int r'(t)$ and $\int g'(-t)$, which in turn is, the convolution of $r(t)$ and $g(-t)$. By Transform Calculus this is the crosscorrelation of $r(t)$ and $g(t)$ which is the desired mathematical result.

The double integration with respect to $\tau$ is obtained by passing the signal from conductors 26 and 28 through amplifier 64, first integrator 66, and second integrator 68 which are connected in series with selector switch 70. The output of integrator 68, which is the desired correlation signal, is stored on channel 44A of drum 42 by record head 72. Upon the completion of one rotation of drums 40 and 42, switch 82 is actuated and the switching mechanisms advance switches 56 and 70 to their No. 2 position where the sequence of operation is repeated for the next channel of information stored on drum 40. The signal $g(t)$ remains as shown in FIGURE 2 and can be repeatedly used or it can be changed at will.

It is to be understood that the apparatus and system contained in the above description are merely representative and illustrative and are not to be construed as limiting the invention as many modifications may be made therefrom without departing from the spirit or scope of the invention.

I claim:
1. An apparatus for use in correlating a first time function by a second time function which comprises:
   an image storage means having a face for displaying said first function completely as a light pattern;
   a photoconductive material placed adjacent the face of said image storage means such that the light pattern of said image storage means makes a similar conductive pattern on the conductive material;
   a magnetic memory medium upon which said second time function is stored; and
   means to move said memory medium by and in close proximity to said photoconductive material such that the two functions are moved along the time axis of each other.

2. An apparatus for use in correlating a first time function having a large number of cycles by a second time function which comprises:
   an image storage means having a face for displaying said first time function completely as a light pattern thereon;
   photoconductive material placed adjacent the face of said image storage means such that the light pattern of said image storage means makes a similar conductive pattern on the conductive material;
   two conductors in spaced-apart contact with said photoconductive material, one of said conductors contacting one end of the photoconductive pattern and the other conductor the other end of such pattern;
   a magnetic storage medium upon which said second function is stored; and
   means to move said storage medium by and in close proximity to said photoconductive material such that the two functions are moved along the time axis of each other.

3. An apparatus as defined in claim 2 including generating means for producing said first time function in analog form and means for impressing such generated signal as a light patern upon the face of said image storage means.

4. An apparatus as defined in claim 3 including recording means connected to said conductors.

5. An apparatus as defined in claim 4 in which said recording means include two integrators connected in series.

6. An apparatus as defined in claim 5 including generating means to generate said second function, including means to place such generated function on said magnetic storage medium.

7. An apparatus for use in correlating a first time function with a second time function which comprises:
   an image storage tube having vertical deflection plates, horizontal deflection plates and a face, said image storage tube being capable of displaying a transient event on its face for at least several minutes;
   a photoconductive material placed adjacent the face of said storage tube such that the light pattern of said image storage means makes a similar conductive pattern on the conductive material;
   a magnetic storage medium upon which said second time function is stored;
   first generating means for generating said first time function in analog form, including means for connecting such signal to said vertical deflection plates;
   means for applying a sweep signal to said horizontal deflection plates in synchronism with production of said analog signal;

means to move said storage medium by and in close proximity to said photoconductive material; and a first electric conductor connected to one end of said photoconductive material to intercept the end of the conductive patern thereon and a second electrical conductor connected to the other end of said photoconductive material to intercept the other end of said conductive path.

8. An apparatus as defined in claim 7 including a recording means connected to the said conductors.

9. An apparatus as defined in claim 7 including reproducing means for reproducing said second time function, including means for applying said reproduced signal to said magnetic storage medium by direct recording.

10. An apparatus for correlating a first time function by a second time function which comprises:

an image storage tube having vertical deflection plates, horizontal deflection plates and a face upon which an image of a transient signal can be displayed;

first means for producing said first function in analog form, including means to connect such analog signal to the vertical deflection plates of said storage tube, such first means including means for producing a synchronizing pulse in synchronism with the beginning of production of said analog signal;

a horizontal sweep generator means connected to said horizontal deflection plates;

means connecting said synchronizing pulse to said horizontal sweep generator;

a photoconductive material positioned adjacent the face of said storage tube;

an endless magnetic tape upon which the second time function can be impressed by A-C-biased direct recording;

pressure roller means positioned to hold said magnetic tape in firm contact with said photoconductive material;

reproducing means for reproducing said second function;

means to record said reproduced second function on said endless tape;

a re-recording means;

means electrically connecting the ends of the signal displayed on said photoconductive material to said re-recording means, such means including a first integrator and a second integrator in series; and means to drive said reproducing drum, said re-recording drum and said magnetic tape in synchronism.

References Cited

UNITED STATES PATENTS 3,087,069    4/1963    Moncrieff-Yeates ____ 250—211
3,318,997    5/1967    Camras _____ 179—100.2 X MALCOLM A. MORRISON, *Primary Examiner.*

FELIX D. GRUBER, *Assistant Examiner.*

U.S. Cl. X.R.

179—100.2; 235—183; 250—217